Figure 1:
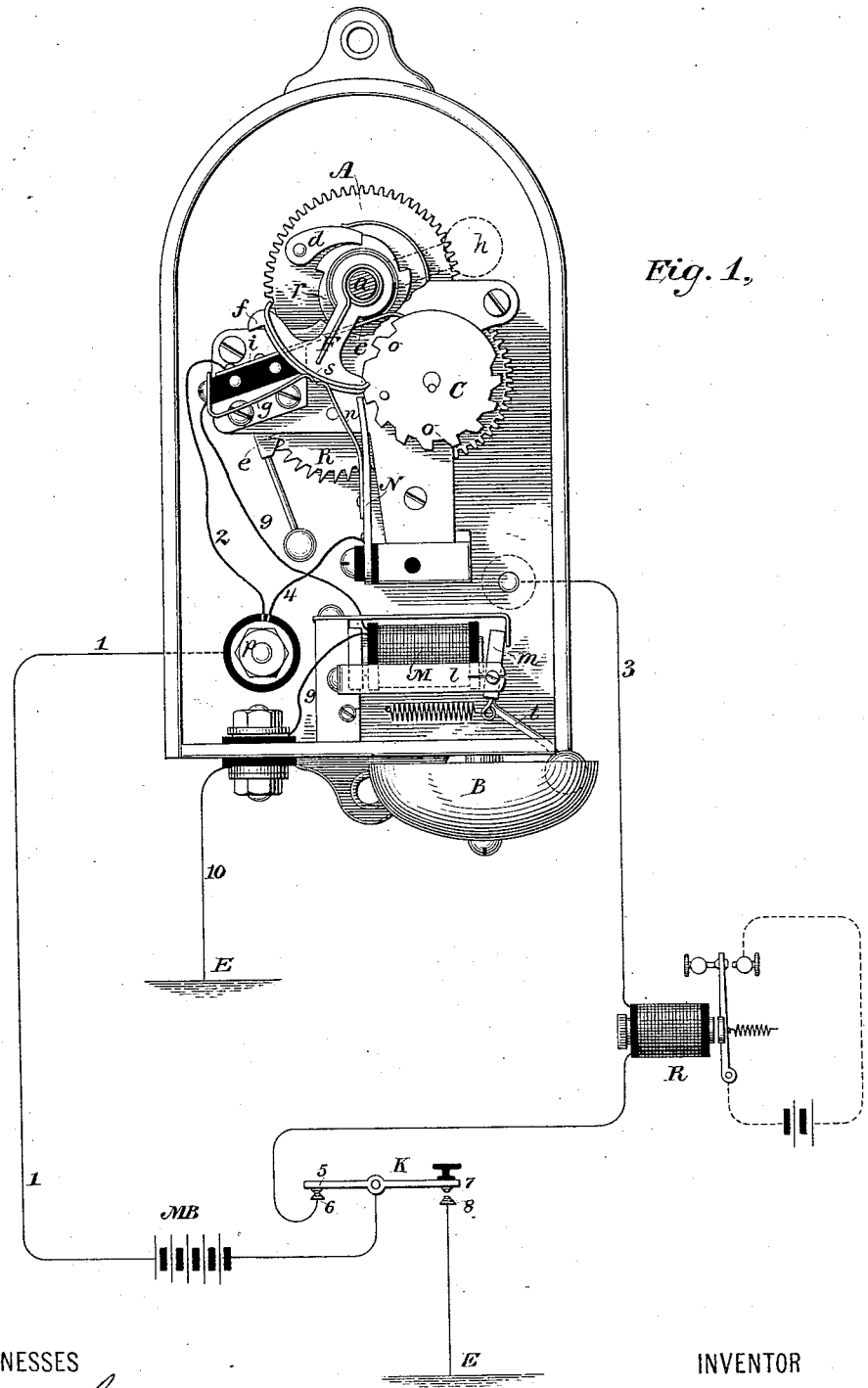

(No Model.)   2 Sheets—Sheet 1.

W. B. VANSIZE.
FIRE ALARM OR DISTRICT TELEGRAPH.

No. 280,536.   Patented July 3, 1883.

WITNESSES   INVENTOR (No Model.) 2 Sheets—Sheet 2.

W. B. VANSIZE.
FIRE ALARM OR DISTRICT TELEGRAPH.

No. 280,536. Patented July 3, 1883.

WITNESSES
Wm A. Skinkle
Geo W. Breck

INVENTOR
Wm B. Vansize

United States Patent Office.

WILLIAM B. VANSIZE, OF BROOKLYN, NEW YORK.

FIRE-ALARM OR DISTRICT TELEGRAPH.

SPECIFICATION forming part of Letters Patent No. 280,536, dated July 3, 1883.

Application filed March 21, 1883. (No model.)

*To all whom it may concern:*

Be it known that I, WM. B. VANSIZE, a citizen of the United States, residing in the city of Brooklyn, county of Kings, and State of New York, have invented certain new and useful Improvements in Fire-Alarm or District Telegraphs; and I declare the following, together with the accompanying drawings, to be a description thereof.

The object of my invention is to provide for the transmission and reception of a "return-signal" in fire-alarm and district telegraphs.

Fire-alarm and district telegraph systems as usually constructed consist of a central or receiving station and a series of signal-stations connected with such central station by an electrical conductor extending from one pole of a battery at the central station through each signal-station, returning to the other pole of said battery, thus forming a complete metallic electrical circuit. At the central station are appropriate receiving-instruments, and at each signal-station is an automatic circuit-breaker, so constructed that when operated it will transmit a predetermined signal, which signal is received at the central station and acted upon as the occasion may require. Owing to unforeseen causes, it sometimes happens that a signal so transmitted is imperfectly received, or that an attempt to transmit a signal entirely fails, any disarrangement of the circuit, as from accidental violence or atmospheric influences entirely unknown to the signal-station, often leading to such result, and it has been found that great damage, loss, and inconvenience sometimes occur.

My invention is designed to obviate or remedy this difficulty, and to render more certain and satisfactory the class of telegraphic service above described, and to this end I provide means for sending a return-signal or answer from the central or receiving station to the signal or transmitting station upon receipt of a signal at such central station, which consists of a normally-open earth branch at the central station, a normally-open earth branch at each signal-station containing an electro-magnet, and means for connecting and disconnecting such earth branches with the main circuit to form a branch circuit embracing such electro-magnet at the signal-station.

For the purpose of illustration I have shown my invention as applied to the well-known "four-call box" used so universally in district-telegraphs, though it is equally applicable to any automatic circuit-breaker operating in substantially the same manner. This signal-box consists of a circular disk or wheel having insulating-spaces upon its periphery. In contact with said periphery is a spring or finger. The wheel and finger form part of the circuit. The wheel is rotated by the power of a coiled spring acting through a train of wheels under control of an appropriate escapement. As the wheel rotates, the circuit is made and broken arbitrarily, according to the arrangement of the insulating-spaces upon the circuit-wheel of any particular box. The spring is wound by the act of turning a crank or handle, and signals of different significance, respectively, are transmitted by causing the circuit-wheel to revolve one, two, three, or more times, such revolutions being obtained by winding the spring to a greater or less extent, according to the number of revolutions desired.

Figure 4:
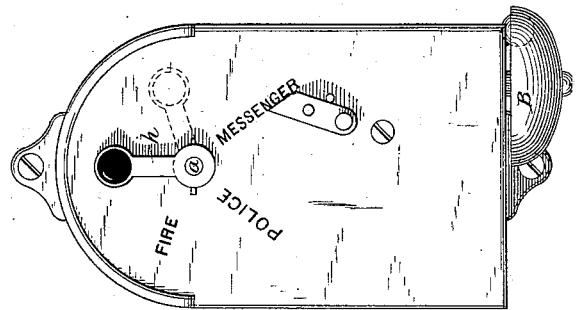
Figure 3:
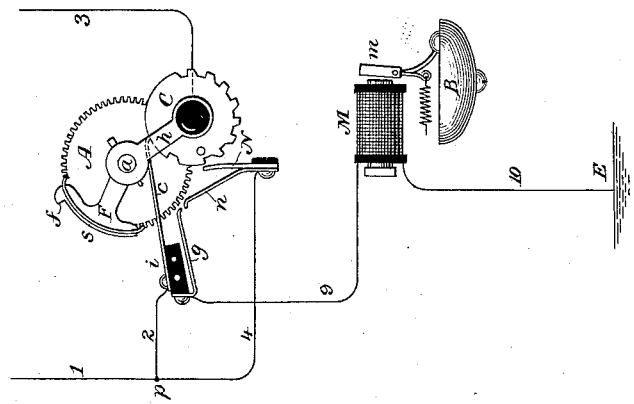
Figure 2:
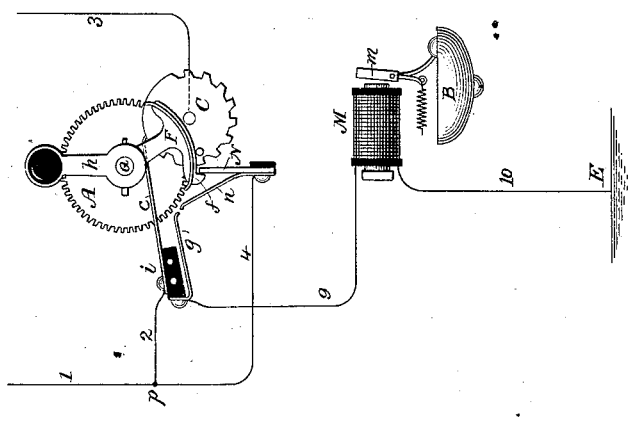

Referring to the accompanying drawings, Figure 1 is a plan view of a signal-box and connections, its cover removed and its mechanism in position to receive a return-signal. Fig. 2 shows the essential elements in a normal position. Fig. 3 shows the same elements in the act of transmitting a signal to the central station by one revolution of the circuit-wheel. Fig. 4 is a view of the cover of the box, showing the normal position of the winding-crank and the points to which it must be moved to send the various signals indicated by the marking thereon.

In Fig. 1, C is the circuit-wheel, having insulating-spaces $o$ in its periphery.

$c$ is an insulated metallic finger resting upon said periphery.

A is a toothed wheel moving freely upon arbor $a$, having fixed to it a dog, $d$. Wheel A engages with a pinion on the arbor of wheel C.

Firmly fixed to arbor $a$ is the ratchet-wheel $r$, crank or handle $h$, and one end of a coil-spring, the other end of which is fastened to the case of the box. By moving handle $h$ a sufficient distance for dog $d$ to engage with the first tooth of ratchet $r$, the coil-spring will be wound sufficiently to rotate wheel C once, the return movement being regulated by escape-wheel R and pawl e. By turning crank h sufficiently far to engage dog d with the second tooth of ratchet-wheel r, wheel C will be rotated twice, and so on.

Firmly fixed to arbor a is the arm F, having projection f.

N is an insulated strip connected with the main circuit by a branch wire, 4. The circuit enters the box by wire 1, going to insulated connecting-post p, thence by wire 2 to insulated finger c, through wheel C and case of the box to wire 3, to the central station, passing through receiving-instrument R, key K, and battery MB. As the circuit-wheel C is rotated the spaces in its periphery pass under finger c and the normally-closed circuit is broken. Receiving-instrument R is thus actuated to register by suitable means each break, and a signal is recorded corresponding to the arrangement of spaces upon any particular circuit-wheel. As arranged in the drawings, this would be two, space, eight, indicating the numeral 28. By referring to Fig. 2, which shows the normal position of these parts, it will be seen that projection f of arm F normally rests against strip N, thus cutting the circuit-wheel out, the current passing by way of 1 4 N f F 3.

The foregoing arrangement is well known, and I will now describe the application of my device for sending a return-signal.

In the bottom of the box I place an electro-magnet, M, having armature m pivoted to strip l, and furnished with a tongue, t, to strike bell B. Through this magnet is connected the wire 9 10 to earth E. The other end of wire 9 is connected to a spring-finger, g, fixed on the insulating-block i. Upon the arm F is firmly fixed a metallic rail, s, bent in the form of the arc described by the end of arm F as it rotates with its support a, and upon this rail s the finger g presses as rail s moves before it, connecting signal-box and earth branch through magnet M. This connection, however, should only take place after the complete transmission of a signal. To accomplish this result and maintain connection between box and earth a sufficient time for the reception of a return-signal, I wind the coil-spring sufficiently to produce one more rotation of wheel C than I desire for the signal, and shunt the circuit around wheel C and finger c during the extra rotation, thus cutting the circuit-breaker out, but continuing the movement of the arm F. For this purpose I extend a spring-finger, n, from the bar N into the path of the rail s, which rail, when its end arrives at that point in its rotation, makes contact with finger n, the circuit then passing by l p 4 n s F to 3.

Fig. 3 shows the essential parts in position to transmit a signal by one revolution of the circuit-wheel, which wheel, however, will rotate twice, the second rotation being cut out. To transmit a signal by two rotations of wheel C, the arm F would be carried round still further, and then released. In all cases wheel C would make one extra rotation.

In Fig. 4 the usual arrangement of the cover of the box is shown, the words "Messenger," "Police," "Fire," &c., showing the points to which crank h must be moved to cause the desired signal to be transmitted, as before explained. The dotted lines, Fig. 4, show the normal position of crank h in a box to which my improvement has not been applied. To secure an additional rotation of the circuit-wheel in all cases, I fix the normal position of crank h upon arbor a at a point to cause dog d to engage the second notch in ratchet-wheel r when crank h is moved from such normal position to the point marked "Messenger," such position of crank h being shown in full line in Fig. 4. The capacity of the box for four signals is not diminished by this arrangement.

At the central station I provide a double-pointed key, K. The earth branch is connected to point 8. Upon depressing K the signal-circuit is broken at 5 6 and connected to the earth at 7 8. The operation of this arrangement is as follows: A party desiring to call a messenger pulls the crank h to the point marked "Messenger" and releases it. Dog d engages the second tooth of ratchet-wheel r. Arm F is carried into the position shown in Fig. 3. The circuit-wheel, rotating in the direction of the hands of a watch, passes the spaces in its periphery under finger c. The circuit is made and broken. The receiving apparatus at the central station is actuated to register when wheel C is constructed as here shown, 28. The moment the last space in c passes under c, finger g makes contact with rail s and the earth branch is connected to the main circuit through magnet M, and before the first space of the next or extra rotation arrives under finger c rail s makes contact with finger n and the circuit-breaker is shunted from circuit, as described above. The clerk or operator at the central station immediately notices whether the signal is legible, and by depressing key K forms a circuit through magnet M at the signal-box via the elements E 8 7 K MB 1, signal-box, wire 9, M, and 10 to E. An arbitrary signal may thus be transmitted by actuating magnet M, and thus sounding bell B, or magnet M may be arranged to drop a pointer, which may be set by the act of operating the box. When the circuit-wheel completes its rotation and the parts assume their normal position, Fig. 2, rail s has passed finger g and the earth branch is disconnected.

It will thus be seen that by the arrangement herein described a circuit may be formed through magnet M for a space of time somewhat longer than that required for the transmission of a signal by one rotation of the signal-wheel, and during that time a return-signal may be transmitted.

Various modifications in the mechanical arrangement of the parts may suggest themselves; but

What I claim, and desire to secure by Letters Patent, is—

1. The combination of an electrical circuit, an automatic circuit-breaker, a normally-open earth branch containing the coils of an electro-magnet, and means for automatically connecting said earth branch and electrical circuit.

2. The combination of a metallic electrical circuit, an automatic circuit-breaker, a normally-open earth branch containing the coils of an electro-magnet, and means for automatically connecting and disconnecting said earth branch and metallic circuit.

3. The combination of an electrical circuit, an automatic circuit-breaker, a normally-open earth branch having an electro-magnet in its circuit, and means for connecting and disconnecting said electrical circuit and earth branch.

4. An automatic rotating circuit-breaker, an electrical circuit, a normally-open earth branch containing the coils of an electro-magnet, and means for connecting and disconnecting said electrical circuit and earth branch during the operation of said circuit-breaker, but after the transmission of its signal.

5. An electrical circuit, an automatic circuit-breaker, a normally-open ground at the central station, a normally-open ground at the signal-station embracing the coils of an electro-magnet, and means for connecting and disconnecting said earth branches and electrical circuit after the transmission of a signal and before the circuit-breaker goes out of action.

6. An electrical circuit, a normally-open earth branch at the central station, and means for connecting and disconnecting said earth branch and electrical circuit, in combination with an automatic circuit-breaker, a normally-open earth branch containing the coils of an electro-magnet at the signal-station, and means for automatically connecting and disconnecting said electrical circuit and normally-open earth branch.

7. In a signal-box, the circuit-breaker C c, arm F, rail s, finger g, magnet M, and wire 9 10.

8. A signal-box having circuit-breaker C c, arm F, rail s, fingers n and g, magnet M, and wire 9 10.

9. The electrical circuit 13, circuit-breaker C c, arm F, having curved surface s, fingers g and n, magnet M, and wire 9 10, substantially as described.

Executed this 19th day of March, 1883.

WM. B. VANSIZE.

Witnesses:
　WM. H. BAKER,
　D. DOREN.